US010999912B1

(12) United States Patent
Chen et al.

(10) Patent No.: US 10,999,912 B1
(45) Date of Patent: May 4, 2021

(54) LIGHTING DRIVER FOR DRIVING LIGHT-EMITTING COMPONENT AT HIGH SPEED

(71) Applicant: ANPEC ELECTRONICS CORPORATION, Hsinchu (TW)

(72) Inventors: Wen-Yen Chen, Hsinchu (TW); Ming-Hung Chang, Hsinchu County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/925,412

(22) Filed: Jul. 10, 2020

(30) Foreign Application Priority Data

Apr. 27, 2020 (TW) ................................. 109113974

(51) Int. Cl.
  *H05B 45/30* (2020.01)
  *H05B 45/46* (2020.01)
  *H05B 45/335* (2020.01)

(52) U.S. Cl.
  CPC ............. *H05B 45/46* (2020.01); *H05B 45/30* (2020.01); *H05B 45/335* (2020.01)

(58) Field of Classification Search
  CPC ...... H05B 45/30; H05B 45/32; H05B 45/335; H05B 45/395; H05B 45/397; H05B 45/46; H05B 45/54
  See application file for complete search history.

(56) References Cited

U.S. PATENT DOCUMENTS

| 8,947,008 B2* | 2/2015 | Chuang | ................ | H05B 45/397 |
| | | | | 315/240 |
| 2013/0057175 A1* | 3/2013 | Chuang | ................ | H05B 45/395 |
| | | | | 315/240 |

\* cited by examiner

*Primary Examiner* — Long Nguyen
(74) *Attorney, Agent, or Firm* — Li & Cai Intellectual Property (USA) Office

(57) ABSTRACT

A lighting driver for driving a light-emitting component at a high speed is provided. A control terminal of a second transistor is connected to a control terminal and a first terminal of a first transistor. Input terminals of an operational amplifier are connected to the first terminal of the first transistor and first terminals of first and second switches. Control terminals of third and fourth transistors are connected to an output terminal of the operational amplifier. Second terminals of the first switch and the fourth transistor are connected to a first terminal of the second transistor. A second terminal of the second switch and a current source are connected to a second terminal of the third transistor. A first terminal of the fourth transistor is connected to the light-emitting component. A control circuit is connected to the current source, and control terminals of the first and second switches.

8 Claims, 5 Drawing Sheets

LIGHTING DRIVER FOR DRIVING LIGHT-EMITTING COMPONENT AT HIGH SPEED

CROSS-REFERENCE TO RELATED PATENT APPLICATION

This application claims the benefit of priority to Taiwan Patent Application No. 109113974, filed on Apr. 27, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a lighting driver of a display device, and more particularly to a lighting driver for driving a light-emitting component at a high speed.

BACKGROUND OF THE DISCLOSURE

A conventional lighting driver may drive a light-emitting component to emit light according to a pulse frequency modulation signal PFM01 shown in FIG. 4B. Before the conventional lighting driver drives the light-emitting component, a preparation time is required for the conventional lighting driver to establish a negative feedback mechanism of an operational amplifier. Therefore, the driving of the light-emitting component is delayed and the pulse frequency modulation signal PFM01 loses energy to form a pulse frequency modulation signal PFM02, which causes energy loss in a current ILED01 of the light-emitting component. As a result, a brightness of the light-emitting component is affected. In order to solve this problem, a current detecting circuit and a compensator circuit are additionally disposed in the conventional lighting driver. After the energy is lost, the current detecting circuit detects a current of the light-emitting component, and the compensator circuit compensates the current ILED0 according to the detected current.

However, when the conventional lighting driver drives the light-emitting component according to a pulse frequency modulation signal PFM03 shown in FIG. 4C, the pulse frequency modulation signal PFM03 loses energy to form a pulse frequency modulation signal PFM04. A working period of the pulse frequency modulation signal PFM03 is longer than that of the pulse frequency modulation signal PFM01. Under this condition, an energy loss of a current ILED02 of the light-emitting component cannot be fully compensated within a remaining time of a non-working period of the pulse frequency modulation signal PFM03. As a result, the current ILED02 of the light-emitting component nonlinearly changes such that the light-emitting component cannot provide a desirable lighting effect.

SUMMARY OF THE DISCLOSURE

In response to the above-referenced technical inadequacies, the present disclosure provides a lighting driver for driving a light-emitting component at a high speed. The lighting driver includes a first current mirror, an operational amplifier, a fast switching circuit, a fourth transistor and a control circuit. The first current mirror includes a first transistor and a second transistor. A first terminal of the first transistor is connected to a common voltage source. A control terminal of the second transistor is connected to a control terminal of the first transistor and the first terminal of the first transistor. A second terminal of the first transistor and a second terminal of the second transistor are coupled to a reference potential. The operational amplifier has a first input terminal and a second input terminal, which are respectively connected to the first terminal of the first transistor and a first terminal of the second transistor. The fast switching circuit includes an input current source, a third transistor, a first switch and a second switch. The third transistor has a first terminal connected to the common voltage source, a second terminal connected to the input current source, and a control terminal connected to an output terminal of the operational amplifier. The first switch has a first terminal connected to the second input terminal of the operational amplifier, and a second terminal connected to the first terminal of the second transistor. The second switch has a first terminal connected to the second input terminal of the operational amplifier, and a second terminal connected to the second terminal of the third transistor. The fourth transistor has a first terminal connected to the light-emitting component, a second terminal connected to the first terminal of the second transistor, and a control terminal connected to the output terminal of the operational amplifier. The control circuit is connected to a control terminal of the first switch and a control terminal of the second switch, and configured to complementarily switch the first switch and the second switch.

In certain embodiments, the input current source is a variable current source. The control circuit is connected to the variable current source and controls the variable current source to supply a current according to an operational parameter of the light-emitting component.

In certain embodiments, the lighting driver further includes a reference current source. The reference current source is connected between the first terminal of the first transistor and the common voltage source, and connected to the control circuit. The control circuit controls the reference current source to supply a current according to an operational parameter of the light-emitting component.

In certain embodiments, the lighting driver further includes a third switch having a first terminal connected to the control terminal of the fourth transistor, a second terminal grounded, and a control terminal connected to the control circuit.

In certain embodiments, the control terminal of the third transistor is connected to the output terminal of the operational amplifier. The third transistor and the fourth transistor form a second current mirror. A ratio coefficient of the third transistor and the fourth transistor depends on an operational parameter of the light-emitting component.

In certain embodiments, the lighting driver further includes a fourth switch. The fourth switch has a first terminal connected to the output terminal of the operational amplifier, a second terminal connected to the control terminal of the fourth transistor, and a control terminal connected to the control circuit.

In certain embodiments, the first input terminal of the operational amplifier is a non-inverting input terminal, and the second input terminal of the operational amplifier is an inverting input terminal.

In certain embodiments, the light-emitting component includes a plurality of light-emitting diodes, which are connected in series with each other.

As described above, the present disclosure provides the lighting driver for driving the light-emitting component at the high speed. The fast switching circuit maintains the voltage of the second input terminal at a constant value during a process of returning the operational amplifier to a closed loop from an open loop. Therefore, the lighting driver of the present disclosure does not need to re-establish internal DC operating points and energy losses of the current of the light-emitting component can be reduced, in comparison with the conventional lighting driver. Furthermore, the input current source of the fast switching circuit of the present disclosure can be the variable current source. The current supplied by the input current source can be adjusted according to the operational parameters of a lighting circuit (such as a current value of the light-emitting component). Therefore, the lighting driver is applicable to drive the light-emitting component such that the current of the light-emitting component changes within a current range.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
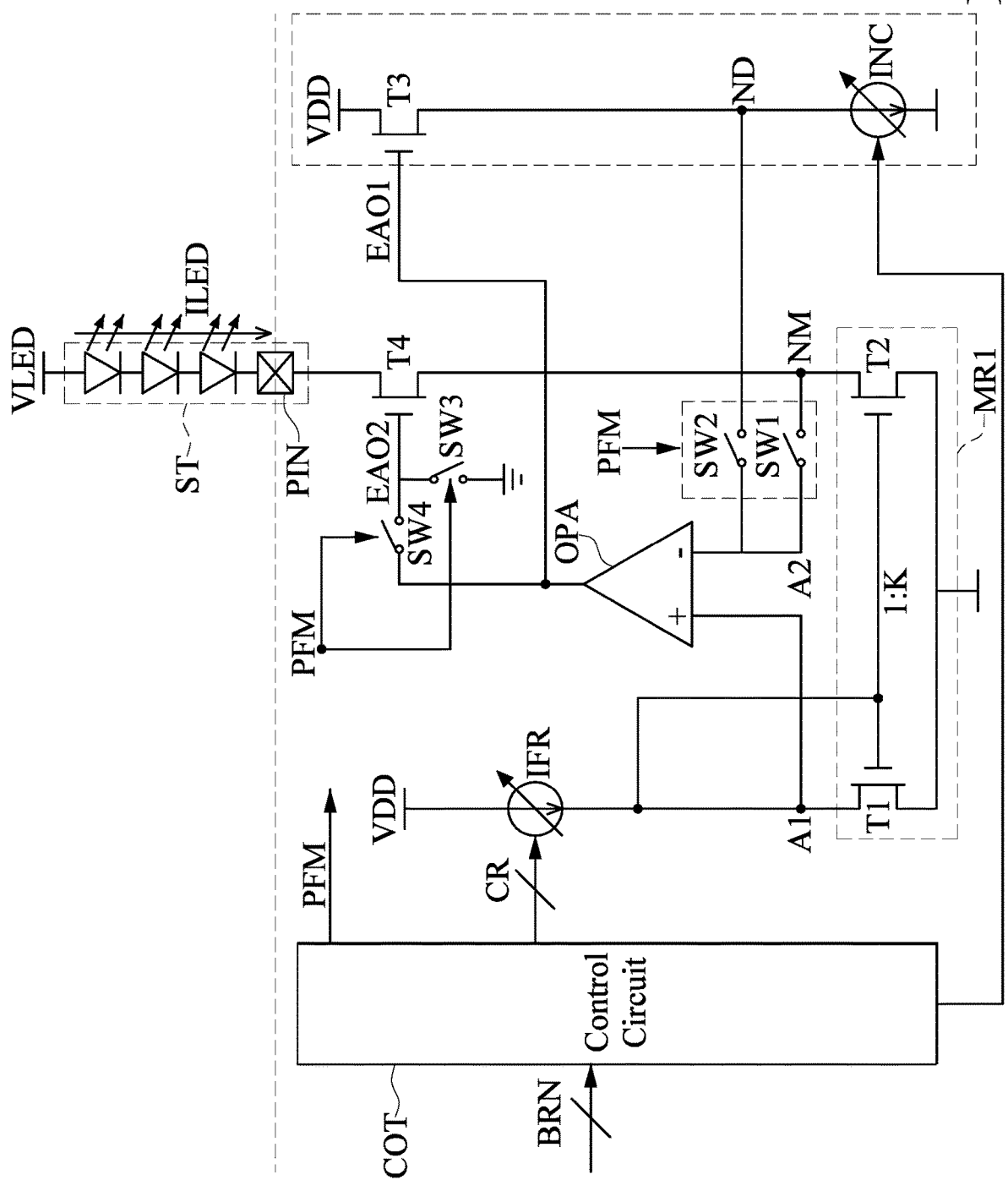
FIG. 1 is a circuit layout diagram of a lighting driver for driving a light-emitting component at a high speed according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit layout diagram of a lighting driver for driving a light-emitting component at a high speed according to a first embodiment of the present disclosure. As shown in FIG. 1, in the embodiment, the lighting driver may include a first current mirror MR1, an operational amplifier OPA, a fourth transistor T4 and a control circuit COT.

For example, a plurality of light-emitting diodes may be connected in series with each other to form the light-emitting component ST, but the present disclosure is not limited thereto. It is worth noting that, in the embodiment, the lighting driver may further include a fast switching circuit for driving the light-emitting component ST to emit light at the high speed. In the embodiment, the fast switching circuit may include an input current source INC, a third transistor T3, a first switch SW1 and a second switch SW2.

The first current mirror MR1 may include a first transistor T1 and a second transistor T2. A ratio of an input current of the first current mirror MR1 (that is a current of the first transistor T1) to an output current of the first current mirror MR1 (that is a current of the second transistor T2) may be 1:K, wherein K is a ratio coefficient and may be any suitable positive integer value. A control terminal of the first transistor T1 is connected to a first terminal of the first transistor T1 and a control terminal of the second transistor T2. A second terminal of the first transistor T1 and a second terminal of the second transistor T2 are coupled to a reference potential.

The operational amplifier OPA has a first input terminal and a second input terminal. The first input terminal such as a non-inverting input terminal of the operational amplifier OPA is connected to the first terminal of the first transistor T1. That is, the first input terminal of the operational amplifier OPA is connected to a node A1. The second input terminal such as an inverting input terminal of the operational amplifier OPA is connected to a first terminal of the first switch SW1 and a first terminal of the second switch SW2. That is, the second input terminal of the operational amplifier OPA is connected to a node A2.

A second terminal of the first switch SW1 is connected to a first terminal of the second transistor T2. A second terminal of the second switch SW2 is connected to a second terminal of the third transistor T3. In other words, the second terminal of the first switch SW1 is connected to a node NM between a second terminal of the fourth transistor T4 and the first terminal of the second transistor T2. The second terminal of the second switch SW2 is connected to a node ND between the second terminal of the third transistor T3 and the input current source INC. An output terminal of the operational amplifier OPA is connected to a control terminal of the third transistor T3. The output terminal of the operational amplifier OPA may be connected to a control terminal of the fourth transistor T4 (through a fourth switch SW4). A first terminal of the third transistor T3 is connected to a common voltage source VDD. The second terminal of the third transistor T3 is connected to the input current source INC. The control circuit COT complementarily switches the first switch SW1 and the second switch SW2.

When the control circuit COT outputs a pulse frequency modulation signal PFM at a low level, the first switch SW1 is turned off. That is, the first switch SW1 is turned off during a non-working period of the pulse frequency modulation signal PFM. After the first switch SW1 is turned off, the second switch SW2 is turned on. Under this condition, the operational amplifier OPA is configured to obtain a voltage of the second terminal of the third transistor T3 (that is a voltage of the node ND) to output an operation amplified signal EAO1 to the control terminal of the third transistor T3. The voltage of the second terminal of the third transistor T3 is inputted to the second input terminal of the operational amplifier OPA.

As a result, the voltage of the second terminal of the third transistor T3 is kept equal to the voltage of the node ND. The voltage of the second terminal of the third transistor T3 approaches a voltage of the second input terminal of the operational amplifier OPA during a working period of a pulse wave of the pulse frequency modulation signal PFM. Therefore, an effect of driving the light-emitting component ST to emit light at the high speed can be achieved.

When the control circuit COT outputs the pulse frequency modulation signal PFM at a high level, the first switch SW1 is turned on and the second switch SW2 is turned off during a working period of a next pulse wave of the pulse frequency modulation signal PFM. When the first switch SW1 is turned on, the second input terminal such as the inverting input terminal of the operational amplifier OPA is connected to the first terminal of the second transistor T2 through the first switch SW1. Under this condition, the operational amplifier OPA is configured to multiply a difference between a voltage of the first terminal of the second transistor T2 (that is a voltage of the node NM) and a voltage of the first terminal of the first transistor T1 (that is a voltage of the node A1) by a gain to output an operation amplified signal EAO2 to the control terminal of the fourth transistor T4 to control the fourth transistor T4 to control a current ILED of the light-emitting component ST.

Further, if the input current source INC is a constant current source, the voltage of the node ND is maintained at a constant value. Under this condition, the lighting driver is applicable to drive the light-emitting component ST to maintain the current ILED at a constant value. If the lighting driver intends to drive the light-emitting component ST such that the current ILED changes within a current range, the input current source INC of the lighting driver needs to be a variable current source.

The control circuit COT may be connected to the input current source INC and the light-emitting component ST. The control circuit COT may obtain operational parameters BRN of the light-emitting component ST such as a current value, a voltage value and a light intensity. The control circuit COT controls the current supplied by the input current source INC to change within the current range to adjust the voltage of the second terminal of the third transistor (that is the voltage of the node ND) to approach the voltage of the node NM, according to the operational parameters BRN of the light-emitting component ST. For example, the larger the current outputted by the input current source INC is, the larger the current ILED flowing through the light-emitting component ST is.

Further, the first terminal of the first transistor T1 may be directly connected to the common voltage source VDD, or may be connected to the common voltage source VDD through a reference current source IFR as shown in FIG. 1. The reference current source IFR may be a variable current source. The control circuit COT may be connected to the reference current source IFR. The control circuit COT outputs a reference control signal CR for controlling a current supplied by the reference current source IFR to adjust the voltage of the first input terminal such as the non-inverting terminal (that is the voltage of the node A1) of the operational amplifier OPA, according to the operational parameters BRN of the light-emitting component ST.

In addition, a third switch SW3 and the fourth switch SW4 may be disposed between the operational amplifier OPA and the fourth transistor T4. In detail, a first terminal of the fourth switch SW4 is connected to the output terminal of the operational amplifier OPA. A second terminal of the fourth switch SW4 is connected to the control terminal of the fourth transistor T4. A first terminal of the third switch SW3 may be connected to the control terminal of the fourth transistor T4. A second terminal of the third switch SW3 is grounded.

A control terminal of the third switch SW3 and a control terminal of the fourth switch SW4 may be connected to the control circuit COT. When the control circuit COT outputs the pulse frequency modulation signal PFM for turning on the fourth switch SW4 and turning off the third switch SW3, the operation amplified signal EAO2 of the operational amplifier OPA is allowed to be outputted to the fourth transistor T4 to control the fourth transistor T4 so as to control a lighting state of the light-emitting component ST When the control circuit COT outputs the pulse frequency modulation signal PFM for turning on the third switch SW3 and turning off the fourth switch SW4, the fourth transistor T4 is grounded through the third switch SW3 to reset a voltage of the control terminal of the fourth transistor T4 to zero.

Figure 2:
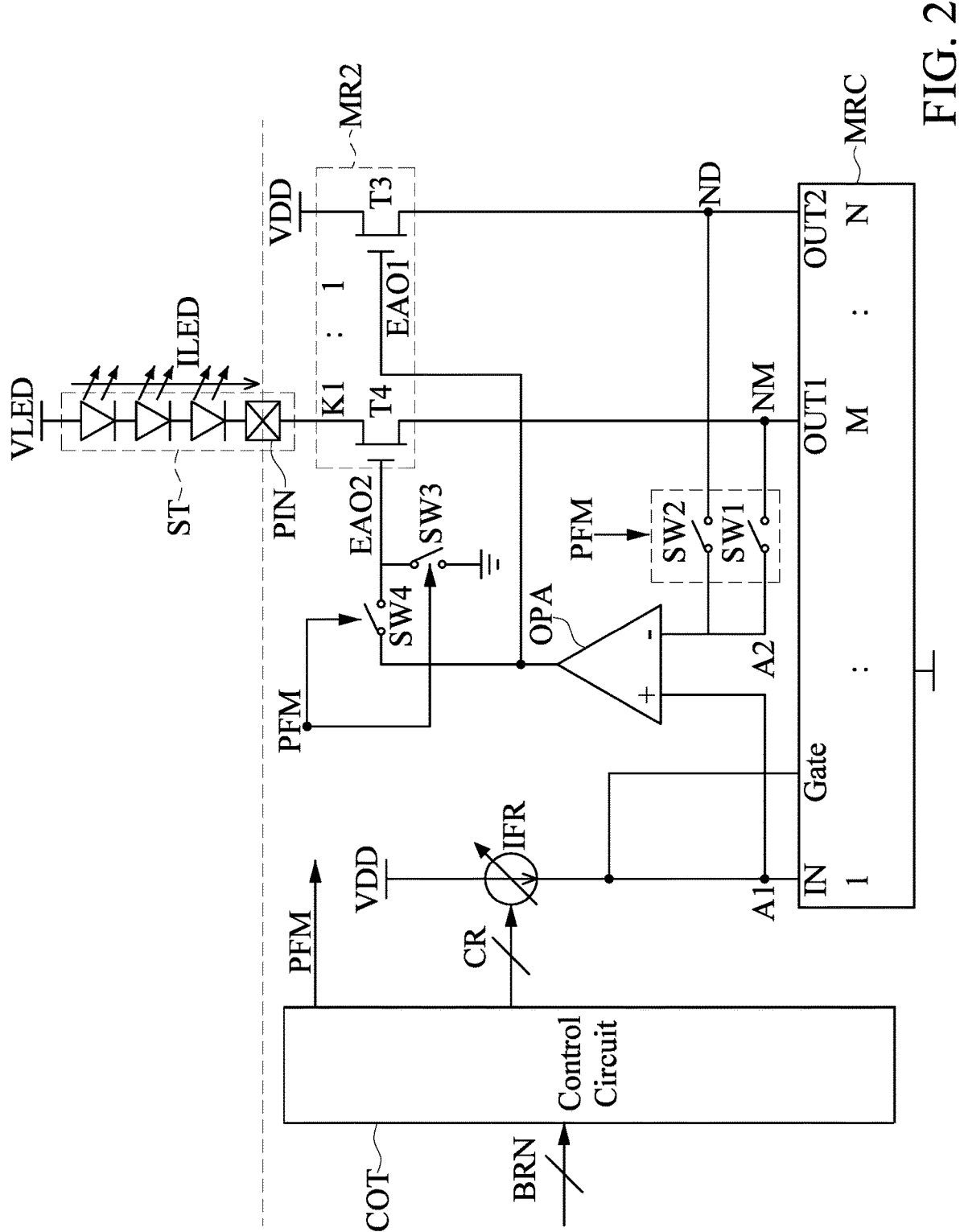
FIG. 2 is a circuit layout diagram of a lighting driver for driving the light-emitting component at the high speed according to a second embodiment of the present disclosure.

Reference is made to FIG. 2, which is a circuit layout diagram of a lighting driver for driving the light-emitting component at the high speed according to a second embodiment of the present disclosure.

As shown in FIG. 2, in the embodiment, the lighting driver may include a second current mirror MR2, an integrated circuit MRC, the fast switching circuit (including the input current source INC, the third transistor T3, the first switch SW1 and the second switch SW2), the operational amplifier OPA, the control circuit COT, the reference current source IFR, the third switch SW3, and the fourth switch SW4. Similar details between the first and second embodiments are not repeated here, but differences between them are specifically described in the following description.

The second current mirror MR2 includes the third transistor T3 and the fourth transistor T4. The control terminal of the third transistor T3 is connected to the output terminal of the operational amplifier OPA. A ratio coefficient K1 of the fourth transistor T4 may depend on the operational parameters BRN of the light-emitting component ST.

For example, the control circuit COT may be connected to the fourth transistor T4 and configured to output a control signal for adjusting the ratio coefficient K1 of the fourth transistor T4 according to the operational parameters BRN of the light-emitting component ST, wherein K1 may be any suitable value.

That is, a ratio of the third transistor T3 to the fourth transistor T4 may depend on the operational parameters BRN such as the current ILED of the light-emitting component ST, but the present disclosure is not limited thereto. The smaller the current ILED of the light-emitting component ST is, the smaller the ratio coefficient K1 of the fourth transistor T4 is. When a gate-to-source capacitance Cgs and a gate-to-drain capacitance (Cgd) of the fourth transistor T4 decrease with decreasing the ratio coefficient K1 of the fourth transistor T4, a reaction speed of the fourth transistor T4 is improved such that the light-emitting component ST is driven by the lighting driver of the embodiment more quickly.

In addition, an input terminal IN and a gate terminal Gate of the integrated circuit MRC may be connected to the common voltage source VDD through the reference voltage source IFR. A first output terminal OUT1 of the integrated circuit MRC may be connected to the second terminal of the fourth transistor T4. A second output terminal OUT2 of the integrated circuit MRC may be connected to the second terminal of the third transistor T3. The integrated circuit MRC may include a current mirror composed of a plurality of transistors. A ratio of the current mirror in the integrated circuit MRC is adjusted to 1:M:N so as to adjust driving of the light-emitting component ST, where N and M can be any appropriate values.

Figure 3:
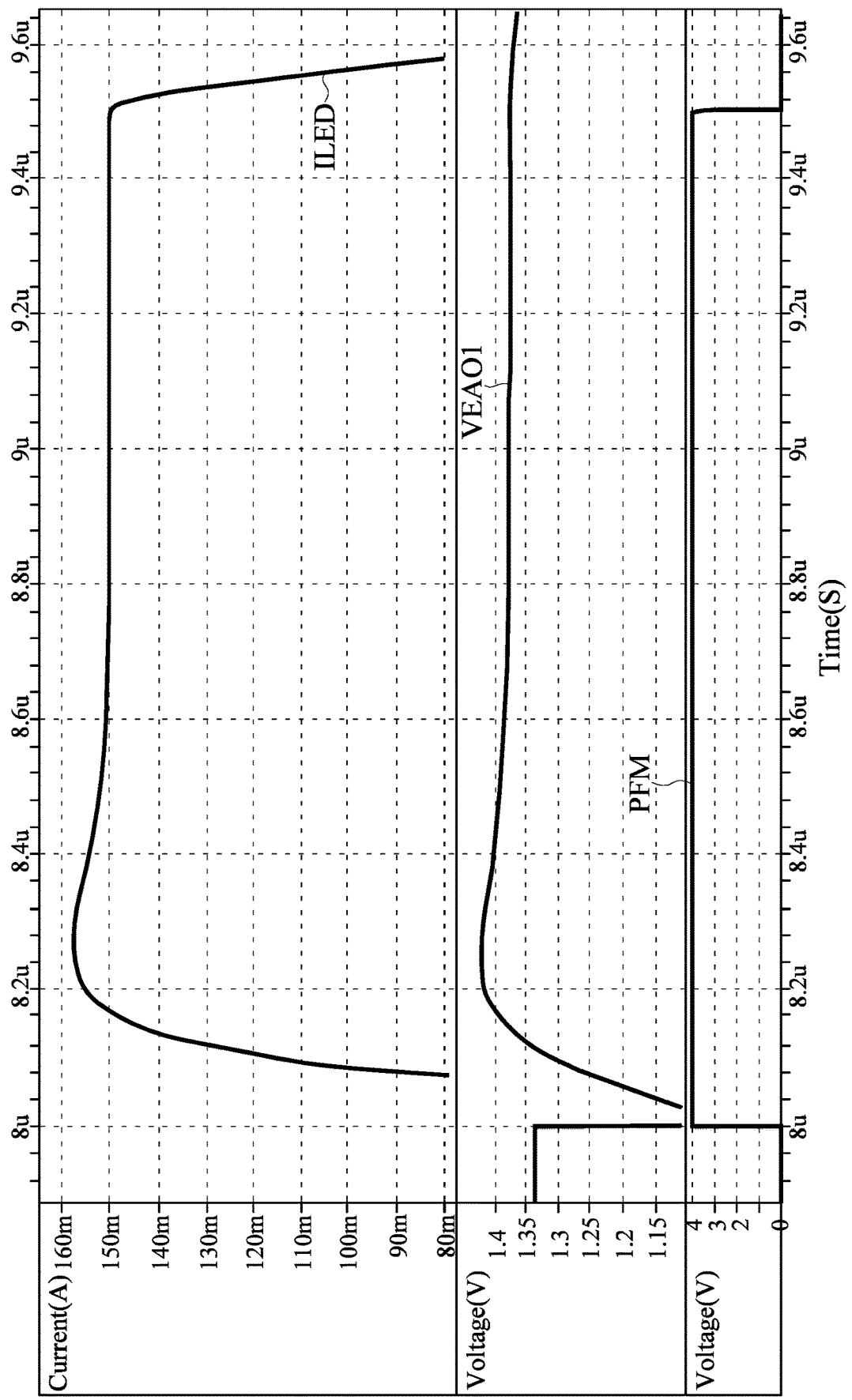
FIG. 3 is a waveform diagram of signals of the lighting driver for driving the light-emitting component at the high speed according to the first and second embodiments of the present disclosure.
Figure 4A:
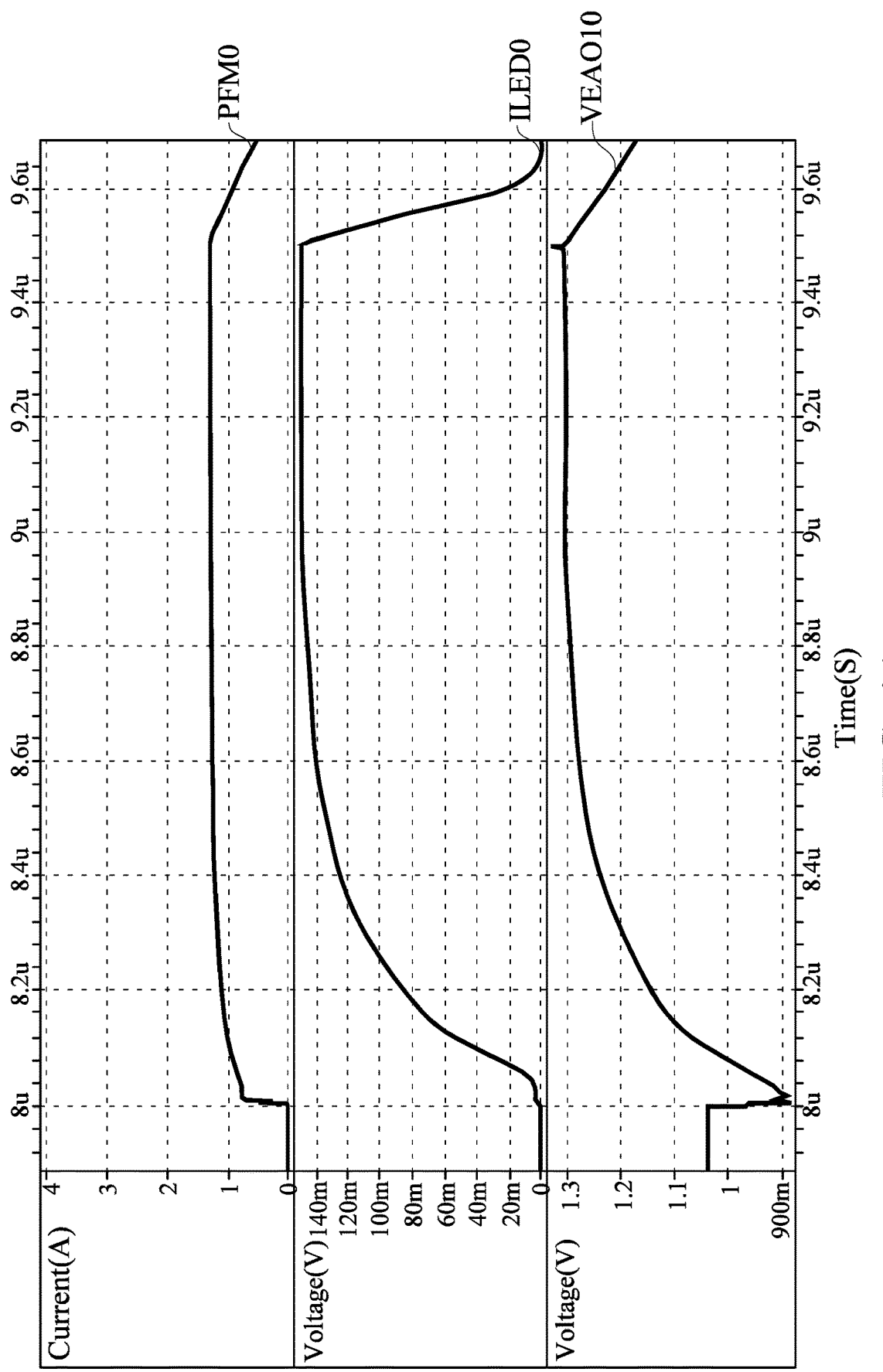
FIG. 4A is a waveform diagram of signals of a conventional lighting driver for driving the light-emitting component.
Figure 4B:
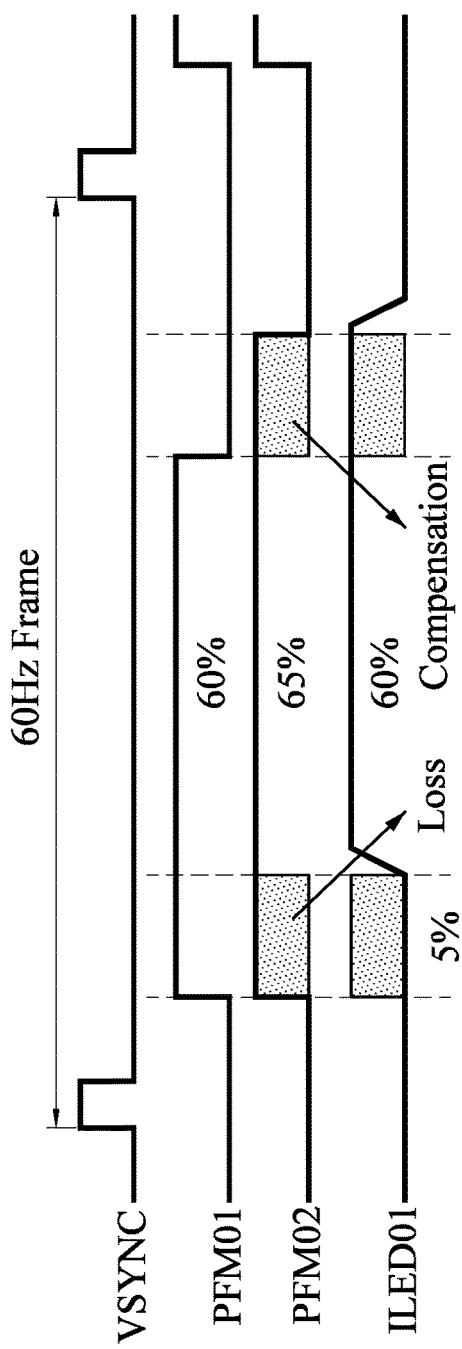
FIG. 4B is a waveform diagram of signals of a conventional lighting driver for driving the light-emitting component.
Figure 4C:
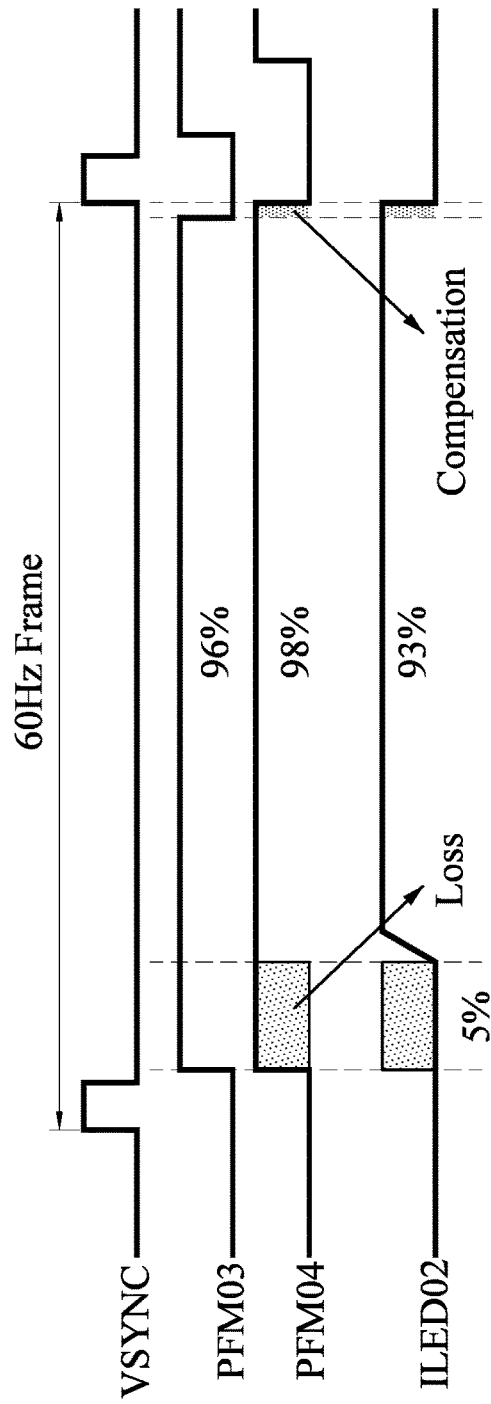
FIG. 4C is a waveform diagram of signals of a conventional lighting driver for driving the light-emitting component.

Reference is made to FIGS. 3 and 4, wherein FIG. 3 is a waveform diagram of signals of the lighting drivers for driving the light-emitting component at the high speed according to the first and second embodiments of the present disclosure, and FIG. 4A is a waveform diagram of signals of a conventional lighting driver for driving the light-emitting component.

When the control circuit COT of the lighting driver in the embodiment as shown in FIGS. 1 and 2 outputs the pulse frequency modulation signal PFM at a high level as shown in FIG. 3, the first switch SW1 is turned on and the second switch SW2 is turned off at the same time. Conversely, when the control circuit COT outputs the pulse frequency modulation signal PFM at a low level, the first switch SW1 is turned off and the second switch SW2 is turned on at the same time.

In the embodiment, the fast switching circuit (including the input current source INC, the third transistor T3, the first switch SW1 and the second switch SW2) drives the light-emitting component such that the current ILED rapidly increases to 150 mA from 0 mA, thereby reducing energy losses of the current ILED. During this process, the operational amplifier OPA of the lighting driver of the embodiment outputs the operation amplified signal EAO1 as shown in FIG. 3.

In contrast, as shown in FIG. 4A, when the conventional lighting driver is used to drive the light-emitting component ST, a current ILED0 of the light-emitting component ST rises slowly for a period of time that results in large energy losses of the current ILED0 and affects the lighting state of the light-emitting component ST. It should be understood that, the higher the current ILED0 of the light-emitting component ST is, the longer the time required for rising the current ILED0 is, and the higher the energy losses.

In summary, the present disclosure provides the lighting driver for driving the light-emitting component at the high speed. The fast switching circuit maintains the voltage of the second input terminal at a constant value during a process of returning the operational amplifier to a closed loop from an open loop. Therefore, the lighting driver of the present disclosure does not need to re-establish internal DC operating points, and the energy losses of the current of the light-emitting component can be reduced, in comparison with the conventional lighting driver. Furthermore, the input current source of the fast switching circuit of the present disclosure can be the variable current source. The current supplied by the input current source can be adjusted according to the operational parameters of a lighting circuit (such as the current value of the light-emitting component). Therefore, the lighting driver is applicable to drive the light-emitting component such that the current of the light-emitting component changes within the current range.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A lighting driver for driving a light-emitting component at a high speed, comprising:
   a first current mirror including a first transistor and a second transistor, wherein a first terminal of the first transistor is connected to a common voltage source, a control terminal of the second transistor is connected to a control terminal of the first transistor and the first terminal of the first transistor, and a second terminal of the first transistor and a second terminal of the second transistor are coupled to a reference potential;
   an operational amplifier having a first input terminal and a second input terminal, which are respectively connected to the first terminal of the first transistor and a first terminal of the second transistor;
   a fast switching circuit, including:
      an input current source;
      a third transistor having a first terminal connected to the common voltage source, a second terminal connected to the input current source, and a control terminal connected to an output terminal of the operational amplifier;
      a first switch having a first terminal connected to the second input terminal of the operational amplifier, and a second terminal connected to the first terminal of the second transistor; and
      a second switch having a first terminal connected to the second input terminal of the operational amplifier, and a second terminal connected to the second terminal of the third transistor;
   a fourth transistor having a first terminal connected to the light-emitting component, a second terminal connected to the first terminal of the second transistor, and a control terminal connected to the output terminal of the operational amplifier; and a control circuit connected to a control terminal of the first switch and a control terminal of the second switch, and configured to complementarily switch the first switch and the second switch.

2. The lighting driver according to claim 1, wherein the input current source is a variable current source that is connected to the control circuit and controlled to supply a current according to an operational parameter of the light-emitting component by the control circuit.

3. The lighting driver according to claim 1, further comprising:
a reference current source being connected between the first terminal of the first transistor and the common voltage source and being connected to the control circuit, and being controlled to supply a current according to an operational parameter of the light-emitting component by the control circuit.

4. The lighting driver according to claim 1, further comprising:
a third switch having a first terminal connected to the control terminal of the fourth transistor, a second terminal grounded, and a control terminal connected to the control circuit.

5. The lighting driver according to claim 1, wherein the control terminal of the third transistor is connected to the output terminal of the operational amplifier, the third transistor and the fourth transistor form a second current mirror, and a ratio coefficient of the third transistor and the fourth transistor depends on an operational parameter of the light-emitting component.

6. The lighting driver according to claim 1, further comprising:
a fourth switch having a first terminal connected to the output terminal of the operational amplifier, a second terminal connected to the control terminal of the fourth transistor, and a control terminal connected to the control circuit.

7. The lighting driver according to claim 1, wherein the first input terminal of the operational amplifier is a non-inverting input terminal, and the second input terminal of the operational amplifier is an inverting input terminal.

8. The lighting driver according to claim 1, wherein the light-emitting component includes a plurality of light-emitting diodes that are connected in series with each other.

* * * * *